(12) United States Patent
Hagl

(10) Patent No.: US 6,320,502 B1
(45) Date of Patent: Nov. 20, 2001

(54) METHOD AND APPARATUS FOR TRANSMITTING DATA BETWEEN A POSITION MEASURING SYSTEM AND AN EVALUATION UNIT

(75) Inventor: Rainer Hagl, Altenmarkt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/040,015

(22) Filed: Mar. 17, 1998

(30) Foreign Application Priority Data

Mar. 18, 1997 (DE) .............................. 197 11 216

(51) Int. Cl.[7] ........................................ G08B 1/00
(52) U.S. Cl. ................ 340/531; 340/679; 340/686.2; 340/310.02; 340/310.06
(58) Field of Search ............................ 340/538, 531, 340/679, 686.1, 686.2, 310.01, 310.02, 310.06

(56) References Cited

U.S. PATENT DOCUMENTS

| | | | |
|---|---|---|---|
| 4,818,111 | * 4/1989 | Affa | 356/374 |
| 5,815,086 | * 9/1998 | Ivie et al. | 340/825.52 |
| 6,114,947 | * 9/2000 | Tondorf | 340/310.01 |

* cited by examiner

Primary Examiner—Daryl Pope
(74) Attorney, Agent, or Firm—Brinks Hofer Gilson & Lione

(57) ABSTRACT

A method for transmitting data between a position measuring system and an evaluating unit that includes the steps of generating a system-specific parameter, transmitting the system specific parameter between a position measuring system and an evaluating unit over at least one supply line.

60 Claims, 1 Drawing Sheet

METHOD AND APPARATUS FOR TRANSMITTING DATA BETWEEN A POSITION MEASURING SYSTEM AND AN EVALUATION UNIT

Applicant claims, under 35 U.S.C. §119, the benefit of priority of the filing date of Mar. 18, 1997 of a German patent application, copy attached, Serial Number 197 11 216.1, filed on the aforementioned date, the entire contents of which are incorporated herein by reference.

FIELD OF THE INVENTION

The present invention relates to a method and an apparatus for transmitting data between a position measuring system and a downstream evaluating unit.

BACKGROUND OF THE INVENTION

Conventional position measuring systems for determining the position of two parts movable relative to one another, for instance on a machine tool, are as a rule connected via a certain number of signal transmission lines with a downstream evaluating unit, for instance a numerical controller. In principle, in transmitting various signals between the position measuring system and the downstream evaluating unit, the attempt is made to keep the number of signal transmission lines required as low as possible. Besides avoiding unnecessary cable-laying effort and expense, another object in the transmission of possibly desired additional signals is to keep the compatibility with the previously conventional number of signal transmission lines assured as much as possible.

From European Patent Application EP 0 660 209 A1 of the present applicant, a position measuring system is known which includes among other elements a read/write memory unit. The memory unit is used in particular for storing system-specific parameters, which can be transferred to the position measuring system for instance from the downstream evaluating unit. When the memory unit is read out, in turn, certain system-specific parameters are transferred from the position measuring system to the evaluating unit. The system-specific parameters that can be stored in the memory unit and read out again are parameters of the entire system, for instance comprising an evaluating unit, a machine tool, and a position measuring system, if the corresponding position measuring system is used in a machine tool. Specifically, this may involve the specification of the measurement system type, the width of the signal period, specifications on the measurement steps in the position measuring system, the form of output signals furnished, reference signal information, machine tool parameters, correction values for the generated signals, and many more.

With the aid of such a memory unit in the position measuring system, it is now possible for instance prior to the actual measurement mode to program the position measuring system in a suitable way, by modifying certain parameters in the memory unit. On the other hand, the evaluating unit used can also be adapted to the existing overall system, by transferring certain parameters from the memory unit to the evaluating unit.

For bidirectional transmission of the system-specific parameters between the position measuring system and the downstream evaluating unit, a separate signal transmission line may for instance be provided. However, this increases the aforementioned cable-laying effort and expense, and moreover in that case the desired compatibility with previous interface standards no longer exists.

The object of the present invention is therefore, in position measuring systems having a read/write memory unit and with the provision for transmission of system-specific parameters from and to an evaluating unit, to keep the expense for the requisite signal connections as low as possible. In particular, given the possible transmission of such system-specific parameters, compatibility with previous interfaces is also desired.

The transmission of incremental position information over a supply line between a position measuring system and an evaluating unit is known from German Patent Disclosure DE 195 04 822. However, this reference neither discusses how system-specific parameters should be transmitted as reliably as possible nor provides details on designing a suitable apparatus or a corresponding method.

SUMMARY OF THE INVENTION

One aspect of the present invention regards a method for transmitting data between a position measuring system and an evaluating unit that includes the steps of generating a system-specific parameter, transmitting the system specific parameter between a position measuring system and an evaluating unit over at least one supply line.

A second aspect of the present invention regards an apparatus for transmitting data between a position measuring system and an evaluating unit, the apparatus includes a position measuring system, an evaluating unit and at least one supply line connected to the position measuring system and the evaluating unit. A modulator unit is connected to the at least one supply line, the modulator unit prepares a system specific parameter that is transmitted over the at least one supply line.

Thus, instead of transmitting the system-specific parameters over a separate signal transmission line between the position measuring system and the evaluating unit, at least one already existing supply line between the position measuring system and the evaluating unit is used for this purpose.

Each of the aspects of the present invention provide the advantage of render the otherwise required signal transmission line and the corresponding additional effort and expense accordingly become unnecessary. On the contrary, the provisions of the invention assure that with the connections already typically present between the position measuring system and the evaluating unit, reliable bidirectional transmission of system-specific parameters is possible.

Each of the aspects of the present invention provide a number of possibilities, especially with regard to the way in which the system-specific data are transmitted over the supply line. Thus there are various possible ways to adapt the apparatus and method of the invention to applicable given conditions.

Further advantages, details and possible embodiments of the method and apparatus according to the invention will become apparent from the ensuing description of an exemplary embodiment in conjunction with the accompanying drawing.

BRIEF DESCRIPTION OF THE DRAWING

The sole FIGURE of the drawing is a schematic block circuit diagram of one possible embodiment of the apparatus according to the invention.

DESCRIPTION OF THE PREFERRED EMBODIMENTS

Figure 1:
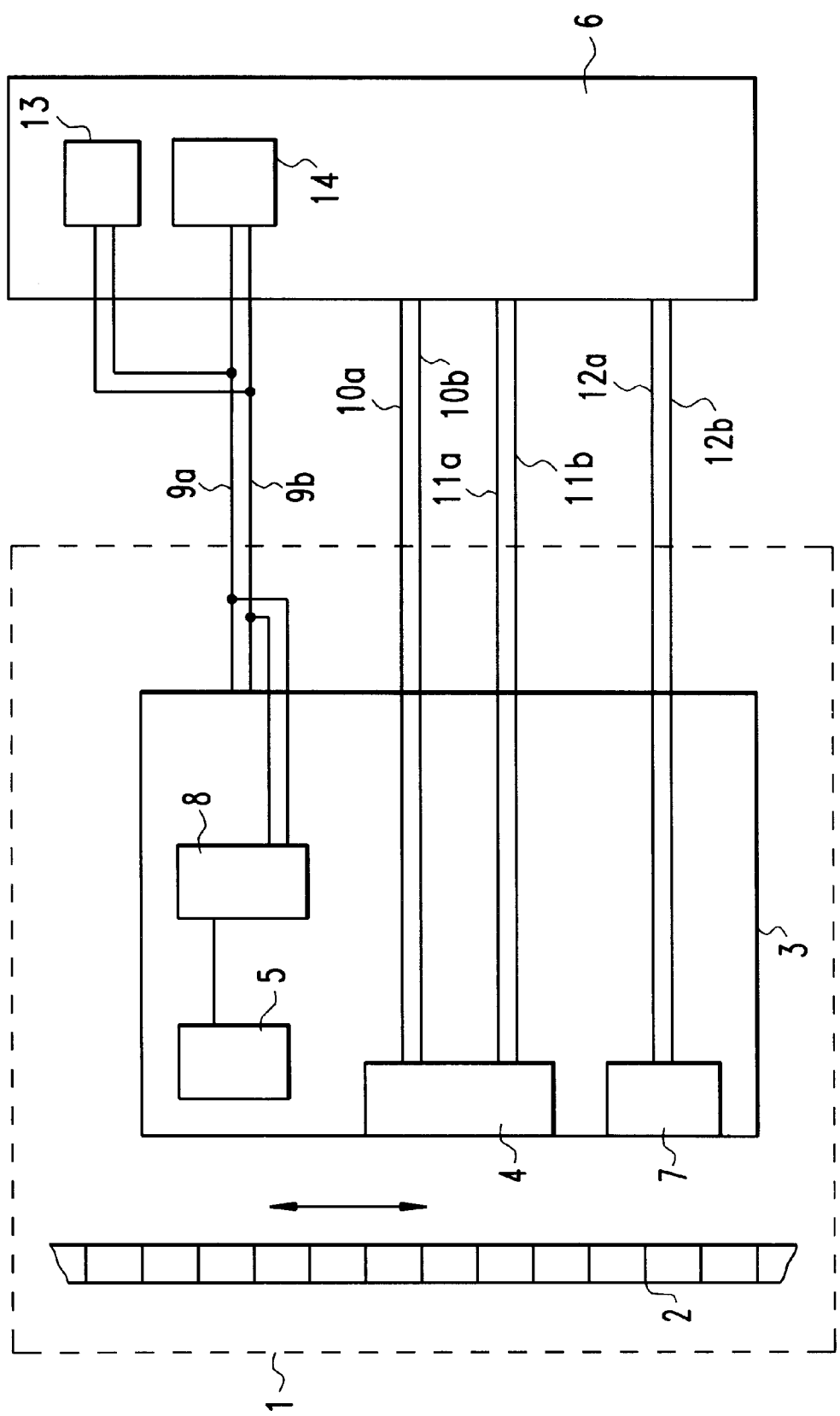

The position measuring system 1 shown includes a scale graduation 2 and a scanning unit 3 movable relative to the scale graduation 2. The position data generated by the position measuring system 1 are transmitted to a downstream evaluating unit 6 for further processing. The scale graduation 2 and the scanning unit 3 are for instance connected to parts of a machine tool that are movable relative to one another and whose relative position with regard to one another is to be determined. In this case, a known numerical machine tool controller is used as the evaluating unit 6.

Along with the schematically shown exemplary embodiment for detecting linear motions, it is understood that position measuring systems that detect rotary motions can also be embodied according to the invention.

In the relative motion of the scale graduation 2 and the scanning unit 3, position-dependent scanning signals are generated, via a schematically indicated signal generating unit 4. The generated data may involve the most various kinds of position data, such as incremental position data, absolute position data or suitable combinations of them, and so forth.

The generation of the various types of position data may also be accomplished in the most various ways. That is, known optical, magnetic, inductive or capacitive scanning principles may be employed for this purpose.

In the case where incremental position data are generated on the basis of optical scanning, a reflectively embodied scale graduation 2 may for instance be provided. The signal generating unit 4 of the scanning unit 3 in turn includes a plurality of light sources, scanning structures, and optoelectronic detector elements.

Absolute position data, on the other hand, may be generated via optical incident-light scanning of a code disk, a process which is also known. Alternatively to this, however, a signal generating unit 4 which furnishes a single signal period over the measurement range and in this way enables absolute position data to be determined and so forth, can also be used for this purpose.

Because of the manifold possible embodiments in terms of the generation of position data, the drawing shows no further details of the signal generating unit 4 but merely schematically indicates it. It is understood that as noted, more than one of the various possibilities for generating position data may be used in combination with one another; that is, in this respect there are multiple possible ways of embodying the signal generating unit 4 accordingly or optionally of providing a plurality of different signal generating units.

The incremental position data generated by the signal generating unit 4 in the exemplary embodiment shown are transmitted in parallel form over a total of four signal transmission lines 10a, 10b, 11a, 11b to the downstream evaluating unit 6. Accordingly, in the case of incremental position data in the relative motion of the scale graduation 2 and the scanning unit 3, the signal generating unit 4 furnishes at least two scanning signals phase-offset by 90° from one another. For each of the two scanning signals, there is also an inverted, that is, a signal phase-offset by 180°, which is likewise transmitted to the evaluating unit 6 for further processing over the signal transmission lines 10a, 10b, 11a, 11b.

In the schematic illustration of FIG. 1, a second signal generating unit 7 is also indicated in the scanning unit 3 that is, in the position measuring system 1. By way of this second signal generating unit, a reference pulse signal is generated in a known way for one or more defined, known relative positions of the scale graduation 2 and scanning unit 3. The reference pulse signals generated by the second signal generating unit 7 are transferred, via a further pair of signal transmission lines 12a, 12b, to the evaluating unit 6, where they are further processed. As in the case of the other signals, once again a transmission of signals inverted relative to one another over the two signal transmission lines 12a, 12b is contemplated. That is, along with the actual reference pulse signal, the signals phase-offset from it by 180° are also transmitted. With regard to the characteristics essential to the invention in terms of transmitting the system-specific parameters over the supply lines 9a, 9b, however, the transmission of the reference pulse signal or the way in which it is transmitted plays no further role, but is merely mentioned in conjunction with possible embodiments of the apparatus or method according to the invention.

Along with the signal generating units 4, 7 mentioned so far, the position measuring system 1 shown also has a read-write memory unit 5. In this memory unit 5, the most various system-specific parameters can be both stored and read out again. In addition, parameters stored in it can naturally also be modified, but the possibility also exists of allowing certain parameters to be changed only by way of suitable authorization. For instance, it is possible to divide up the memory unit 5 into a plurality of regions with different access rights; while a first memory region is accessible only to the particular manufacturer of that position measuring system, a second memory region may also be written into and read out of by the user, and so-forth. In one possible embodiment, for instance, the memory unit 5 is embodied as an EPROM in a known way.

The system-specific parameters that can be stored in the memory unit 5 and modified and read out again may for instance be characteristic parameters of the position measuring system, which are specified by the applicable manufacturer, such as information on how the memory unit 5 is organized, the type of position measuring system, information on the signal period and the measurement steps, the location of the reference marks, etc. In the memory unit 5, parameters that are significant for the planned measurement mode, such as information on the location of the zero point, can also be modified by the user or rewritten. Furthermore, correction values can be stored in the memory unit 5, and these values can be imposed on the generated signals in order to compensate for possible signal errors. With regard to other system-specific parameters, reference may also be made to the aforementioned EP 0 660 209 filed by the present applicant.

This kind of modification, writing or readout of the system-specific parameters of the position measuring system 1 is preferably done prior to the actual measurement; that is, a suitable transmission of the associated signals is as a rule needed only intermittently. Otherwise, such a procedure might be necessary in the event of an error, for diagnostic purposes, for instance.

The modification, writing or readout of the system-specific parameters is done via the downstream evaluating unit 6, and hence an appropriate signal connection with the memory unit 5 is necessary. According to the invention, at least one of the existing supply lines 9a, 9b is now used for this purpose, lines over which otherwise the current and voltage supply to the position measuring system 1, or the corresponding components such as light sources, detector elements, etc., is accomplished. In the evaluating unit 6, a current and voltage supply unit 14 is provided for this purpose, though it need not necessary integrated with the evaluating unit 6. It is well known in the art that such a current and voltage supply unit 14 can be referred to as a power supply since it generates electric power that is transmitted along at least one of the power supply lines 9a, 9b to the position measuring system.

The communication between the evaluating unit 6 and the position measuring system 1 or memory unit 5 over the supply lines 9a, 9b can preferably be accomplished in both directions, or in other words can be designed bidirectionally. Thus, both a readout and a modification or writing in of system-specific parameters into the memory unit 5 in serial form is assured. To transmit the most various system-specific data over at least one of the available supply lines 9a, 9b, the system specific data has to be prepared for transmission over the supply lines 9a, 9b to the position measuring system 1 prior to a measurement performed by the position measuring system 1. On the transmission side preparation in the form of a modulation of the data or parameters to be transmitted is contemplated, while on the reception side a corresponding separation or demodulation of the transmitted signals from the respective supply line 9a, 9b is necessary. To that end, in the case of bidirectional serial transmission of system-specific parameters, modulator/demodulator units 8, 13 which perform these tasks, are disposed in both the position measuring system 1 and the evaluating unit 6, respectively. Thus, while a corresponding modulator stage of such a unit prepares the system-specific parameters read out of the memory unit 5 for transmission via supply lines 9a, 9b to the evaluating unit 6, the respective demodulator stage separates or decouples these data or parameters from the supply line 9a, 9b. Although in FIG. 1 the modulator/demodulator units 8, 13 are shown merely schematically as combined units, it is naturally also possible to provide separate units for modulation and demodulation, respectively, of the transmitted data. For transmitting the various system-specific parameters, the most various known modulation methods may be employed.

In the embodiment shown, for transmitting the system-specific parameters, the two existing supply lines 9a, 9b of the direct-voltage distributor are used. Thus, the system-specific parameters and the electric power travel within the same power lines and so it is inherent that the system-specific parameters are transmitted along, at least partially, an electrically conductive path that is identical to an electrically conductive path which the electric power of the supply lines travels. While the system-specific parameters are transmitted in modulated form over one of the two supply lines 9a, 9b, a transmission of the signals inverted from it, that is, phase-offset by 180°, is done over the respectively other supply line 9a, 9b.

Along with this possibility of transmitting the inverted signals as well, it is understood that other possibilities for transmitting system-specific parameters also exist. For instance, where there are two existing supply lines 9a, 9b in the case of direct-voltage supply to the position measuring system 1, one of the two supply lines 9a can be used for transmission in one direction from the position measuring system 1 to the evaluating unit 6 and the other supply line 9b can be used for transmission of data from the evaluating unit 6 to the position measuring system 1.

Along with the provisions described thus far, it also proves to be advantageous, via suitably disposed filter elements in the supply lines 9a, 9b, to prevent the modulated signals from interfering with the current or voltage supply to the position measuring system 1 and/or the evaluating unit 6. To that end, upstream of the corresponding elements that are connected on both sides to the supply lines 9a, 9b, suitable filter elements may be provided.

On the basis of the provisions of the invention, it is now possible to transmit system-specific parameters using at least one of the existing supply lines; that is, no additional cable-laying effort or expense is involved. In addition, the compatibility with the number of previous connections between the position measuring system 1 and the evaluating unit 6 is assured.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method for transmitting data between a position measuring system and an evaluating unit, the method comprising the steps of:

preparing a system-specific parameter that is a characteristic parameter of a position measuring system that determines the position of two parts movable relative to one another;

transmitting said system specific parameter between said position measuring system and an evaluating unit over at least one power supply line that supplies electrical power to said position measuring system so that said system specific parameter is transmitted along an electrically conductive path that is identical to an electrically conductive path upon which said supplied power follows.

2. The method of claim 1, wherein said system specific parameter comprises information on how a memory unit is organized.

3. The method of claim 1, wherein said system specific parameter comprises information on the type of said position measuring system.

4. The method of claim 1, wherein said transmitting step is performed at least intermittently.

5. The method of claim 1, wherein said system-specific parameter is transmitted in modulated form over said at least one power supply line.

6. The method of claim 1, wherein said system-specific parameter is transmitted bidirectionally over said at least one power supply line.

7. The method of claim 1, further comprising the steps of:

reading out said system-specific parameter out of a memory unit of said position measuring system;

preparing said system-specific parameter read out of said memory unit for transmission over said at least one power supply line; and transmitting said prepared system-specific parameter to said evaluating unit.

8. The method of claim 1, further comprising the steps of:

selecting in said evaluating unit a certain system-specific parameter for the subsequent measuring operation of said position measuring system;

preparing said selected system-specific parameter for transmission over said at least one power supply line; and transmitting said prepared system-specific parameter to said position measuring system.

9. The method of claim 8, comprising the step of storing said prepared system-specific parameter transmitted to said position measuring system in a memory unit in said position measuring system.

10. The method of claim 1, comprising the step of said position measuring system performing a measurement.

11. The method of claim 10, further comprising the steps of:

reading out said system-specific parameter out of a memory unit of said position measuring system;

preparing said system-specific parameter read out of said memory unit for transmission over said at least one power supply line; and transmitting said prepared system-specific parameter to said evaluating unit.

12. The method of claim 10, further comprising the steps of:

selecting in said evaluating unit a certain system-specific parameter for the subsequent measuring operation of said position measuring system;

preparing said selected system-specific parameter for transmission over said at least one power supply line; and transmitting said prepared system-specific parameter to said position measuring system.

13. The method of claim 11, wherein said reading out, preparing and transmitting steps are performed prior to said step of said position measuring system performing a measurement.

14. The method of claim 12, wherein said selecting, preparing and transmitting steps are performed prior to said step of said position measuring system performing a measurement.

15. The method of claim 1, further comprising the steps of:

preparing said system-specific parameter; and separating said transmitted system specific parameter from said at least one power supply line.

16. The method of claim 15, wherein said preparing and separating steps are effected in said position measuring system and/or in said evaluating unit.

17. The method of claim 15, wherein said preparing and separating steps are effected by a respective modulator/demodulator unit.

18. The method of claim 1, further comprising the steps of:

transmitting a current and a voltage for the position measuring system over said one or more power supply lines.

19. An apparatus for transmitting data between a position measuring system and an evaluating unit, the apparatus comprising:

a position measuring system that determines the position of two parts movable relative to one another;

an evaluating unit;

at least one power supply line said position measuring system and said evaluating unit; wherein said at least one power supply line supplies electrical power to said position measuring system;

a modulator unit connected to said at least one power supply line, said modulator unit prepares a system specific parameter that is transmitted over said at least one power supply line, wherein said system specific parameter is a characteristic parameter of said position measuring system and said system specific parameter is transmitted along an electrically conductive path that is identical to an electrically conductive path upon which said supplied power follows; and a demodulator unit that decouples said system specific parameter from said at least one power supply line.

20. The apparatus of claim 19, wherein at least intermittently, a serial transmission of said system-specific parameter is effected between said position measuring system and said evaluating unit over said at least one power supply line.

21. The apparatus of claim 19, wherein said position measuring system comprises a memory unit into which said system-specific parameter can both be written into and read from via said at least one power supply line.

22. The apparatus of claim 21, wherein said memory unit is divided up into a plurality of regions with different access rights.

23. The apparatus of claim 22, wherein one of said plurality of regions is accessible only to the particular manufacturer of said position measuring system.

24. The apparatus of claim 22, wherein one of said plurality of regions may be written into and read out of by a user of said position measuring system.

25. The apparatus of claim 19, wherein said position measuring system comprises a filter element connected to said at least one power supply line over which a transmission of said system-specific parameter is effected.

26. The apparatus of claim 19, wherein said evaluating unit comprises a filter element connected to said at least one power supply line over which a transmission of said system-specific parameter is effected.

27. The apparatus of claim 19, wherein at least two signal transmission lines are disposed between said position measuring system and said evaluating unit, over which lines two phase-offset incremental signals can be transmitted from said position measuring system to said evaluating unit.

28. The apparatus of claim 27, comprising two further signal transmission lines, over which inverted signals, in comparison with said two phase-offset incremental signals, can be transmitted.

29. The apparatus of claim 19, comprising two signal transmission lines disposed between said position measuring system and said evaluating unit, said two signal transmission lines transmit reference pulse signals and signals inverted relative to said reference pulse signals.

30. The apparatus of claim 27, further comprising two additional signal transmission lines disposed between said position measuring system and said evaluating unit, said two additional signal transmission lines transmit reference pulse signals and signals inverted relative to said reference pulse signals.

31. The apparatus of claim 28, further comprising two additional signal transmission lines disposed between said position measuring system and said evaluating unit, said two additional signal transmission lines transmit reference pulse signals and signals inverted relative to said reference pulse signals.

32. An apparatus for transmitting data between a position measuring system and an evaluating unit, the apparatus comprising:

a position measuring system that determines the position of two parts movable relative to one another;

an evaluating unit;

at least one power supply line that supplies electrical power to said position measuring system and said evaluating unit; wherein at least two signal transmission lines are disposed between said position measuring system and said evaluating unit, over which said at least two signal transmission lines two phase-offset incremental signals can be transmitted from said position measuring system to said evaluating unit;

a modulator unit connected to said at least one power supply line, said modulator unit prepares a system specific parameter that is transmitted over said at least one power supply line, wherein said system specific parameter is significant for a planned measurement mode of said position measuring system and said system specific parameter is transmitted along an electrically conductive path that is identical to an electrically conductive path upon which said supplied power follows; and a demodulator unit that decouples said system specific parameter from said at least one power supply line.

33. The apparatus of claim 32, comprising two further signal transmission lines, over which inverted signals, in comparison with said two phase-offset incremental signals, can be transmitted.

34. The apparatus of claim 32, comprising two signal transmission lines disposed between said position measuring system and said evaluating unit, said two signal transmission lines transmit reference pulse signals and signals inverted relative to said reference pulse signals.

35. The apparatus of claim 32, further comprising two additional signal transmission lines disposed between said position measuring system and said evaluating unit, said two additional signal transmission lines transmit reference pulse signals and signals inverted relative to said reference pulse signals.

36. The apparatus of claim 33, further comprising two additional signal transmission lines disposed between said position measuring system and said evaluating unit, said two additional signal transmission lines transmit reference pulse signals and signals inverted relative to said reference pulse signals.

37. The apparatus of claim 32, wherein at least intermittently, a serial transmission of said system-specific parameter is effected between said position measuring system and said evaluating unit over said at least one power supply line.

38. The apparatus of claim 32, wherein said position measuring system comprises a memory unit into which said system-specific parameter can both be written into and read from via said at least one power supply line.

39. The apparatus of claim 38, wherein said memory unit is divided up into a plurality of regions with different access rights.

40. The apparatus of claim 39, wherein one of said plurality of regions is accessible only to the particular manufacturer of said position measuring system.

41. The apparatus of claim 39, wherein one of said plurality of regions may be written into and read out of by a user of said position measuring system.

42. The apparatus of claim 32, wherein said position measuring system comprises a filter element connected to said at least one power supply line over which a transmission of said system-specific parameter is effected.

43. The apparatus of claim 32, wherein said evaluating unit comprises a filter element connected to said at least one power supply line over which a transmission of said system-specific parameter is effected.

44. The apparatus of claim 32, wherein at least two signal transmission lines are disposed between said position measuring system and said evaluating unit, over which lines two phase-offset incremental signals can be transmitted from said position measuring system to said evaluating unit.

45. The apparatus of claim 44, comprising two further signal transmission lines, over which inverted signals, in comparison with said two phase-offset incremental signals, can be transmitted.

46. The apparatus of claim 32, comprising two signal transmission lines disposed between said position measuring system and said evaluating unit, said two signal transmission lines transmit reference pulse signals and signals inverted relative to said reference pulse signals.

47. The apparatus of claim 44, further comprising two additional signal transmission lines disposed between said position measuring system and said evaluating unit, said two additional signal transmission lines transmit reference pulse signals and signals inverted relative to said reference pulse signals.

48. The apparatus of claim 45, further comprising two additional signal transmission lines disposed between said position measuring system and said evaluating unit, said two additional signal transmission lines transmit reference pulse signals and signals inverted relative to said reference pulse signals.

49. A method for transmitting data between a position measuring system and an evaluating unit, the method comprising the steps of:

preparing a system-specific parameter that is significant for a planned measurement mode of a position measuring system that determines the position of two parts movable relative to one another;

transmitting said system specific parameter between said position measuring system and an evaluating unit over at least one power supply line that supplies electrical power to said position measuring system, wherein said system specific parameter is transmitted along an electrically conductive path that is identical to an electrically conductive path upon which said supplied power follows.

50. The method of claim 49, wherein said system specific parameter comprises information on the signal period and the measurement steps.

51. The method of claim 49, wherein said system specific parameter comprises information on the location of reference marks.

52. The method of claim 49, wherein said system specific parameter comprises information on the location of the zero point.

53. The method of claim 49, wherein said system-specific parameter is transmitted bidirectionally over said at least one power supply line.

54. The method of claim 49, further comprising the steps of:

reading out said system-specific parameter out of a memory unit of said position measuring system;

preparing said system-specific parameter read out of said memory unit for transmission over said at least one power supply line; and transmitting said prepared system-specific parameter to said evaluating unit.

55. The method of claim 49, further comprising the steps of:

selecting in said evaluating unit a certain system-specific parameter for the subsequent measuring operation of said position measuring system;

preparing said selected system-specific parameter for transmission over said at least one power supply line; and transmitting said prepared system-specific parameter to said position measuring system.

56. A method for transmitting data between a position measuring system and an evaluating unit, the method comprising the steps of:

preparing a system-specific parameter;

transmitting said system specific parameter between a position measuring system that determines the position of two parts movable relative to one another and an evaluating unit over at least one power supply line that supplies electrical power to said position measuring system, wherein said preparing and transmitting steps are performed prior to said position measuring system performing a measurement that determines said position, wherein said system specific parameter is transmitted along an electrically conductive path that is identical to an electrically conductive path upon which said supplied power follows.

57. The method of claim 56, further comprising the steps of:

reading out said system-specific parameter out of a memory unit of said position measuring system;

preparing said system-specific parameter read out of said memory unit for transmission over said at least one power supply line; and transmitting said prepared system-specific parameter to said evaluating unit.

58. The method of claim 56, further comprising the steps of:

selecting in said evaluating unit a certain system-specific parameter for the subsequent measuring operation of said position measuring system;

preparing said selected system-specific parameter for transmission over said at least one power supply line; and transmitting said prepared system-specific parameter to said position measuring system.

59. The method of claim 58, comprising the step of storing said prepared system-specific parameter transmitted to said position measuring system in a memory unit in said position measuring system.

60. The method of claim 58, wherein said selecting step is performed prior to said position measuring system performing said measurement.

* * * * *